(12) United States Patent (10) Patent No.: US 6,979,087 B2
Honig et al. (45) Date of Patent: Dec. 27, 2005

(54) DISPLAY SYSTEM WITH INTERPRETABLE PATTERN DETECTION

(75) Inventors: Howard L Honig, Corvallis, OR (US); Jian-gang Weng, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 203 days.

(21) Appl. No.: 10/286,061

(22) Filed: Oct. 31, 2002

(65) Prior Publication Data

US 2004/0085522 A1 May 6, 2004

(51) Int. Cl.[7] ............................................... G03B 21/00
(52) U.S. Cl. ........................ 353/121; 353/42; 353/122
(58) Field of Search .......................... 353/42, 101, 122, 353/121; 345/716, 719, 722

(56) References Cited

U.S. PATENT DOCUMENTS

| | | | |
|---|---|---|---|
| 5,138,304 A | 8/1992 | Bronson | |
| 5,181,015 A | 1/1993 | Marshall et al. | |
| 5,235,363 A | * 8/1993 | Vogeley et al. | ............. 353/122 |
| 5,422,693 A | * 6/1995 | Vogeley et al. | ............. 353/122 |
| 5,489,923 A | 2/1996 | Marshall et al. | |
| 5,504,501 A | 4/1996 | Hauck et al. | |
| 5,515,079 A | 5/1996 | Hauck | |
| 6,050,690 A | * 4/2000 | Shaffer et al. | ............. 353/122 |
| 6,188,789 B1 | 2/2001 | Marianetti, II et al. | |
| 6,346,933 B1 | * 2/2002 | Lin | ............................ 345/157 |
| 6,454,419 B2 | * 9/2002 | Kitazawa | .................... 353/122 |
| 2002/0186351 A1 | * 12/2002 | Gnanamgari et al. | ......... 353/42 |
| 2003/0025884 A1 | * 2/2003 | Hamana et al. | ............... 353/42 |

* cited by examiner

Primary Examiner—William C. Dowling

(57) ABSTRACT

A method of controlling a display system includes projecting an image onto a surface, projecting a control beam onto the surface, tracing an interpretable pattern with the control beam, detecting the interpretable pattern, and correlating the interpretable pattern with a predefined command.

29 Claims, 3 Drawing Sheets

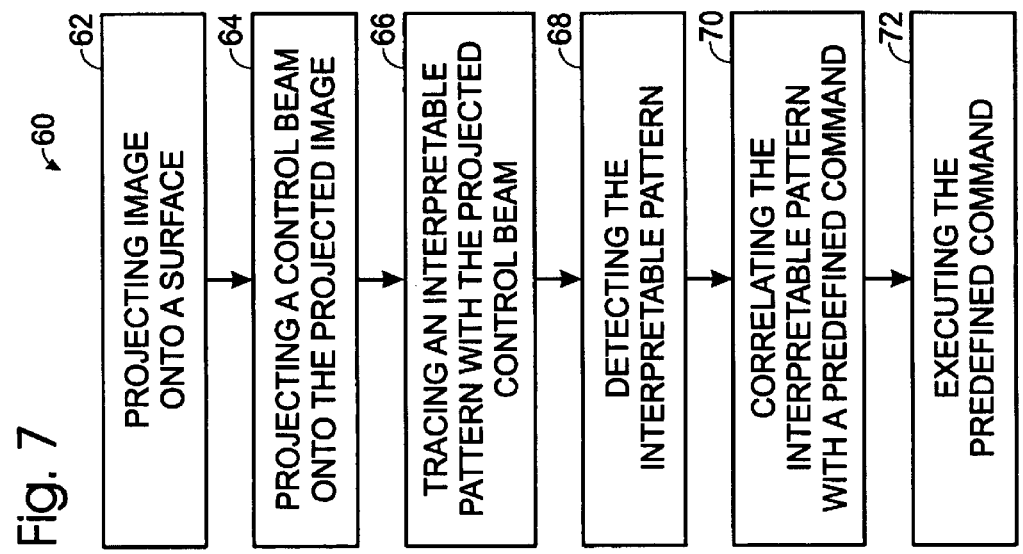

DISPLAY SYSTEM WITH INTERPRETABLE PATTERN DETECTION

BACKGROUND

Image projection systems may be used to enlarge a still or video image, or to enable the image to be viewed simultaneously by a large or small audience. Light pens have proven to be useful tools for use in presentations involving projected images, where they are typically utilized as nothing more than a pointer. Although light pens have been used as a substitute cursor, or mouse, such use typically has required the projected image to include pull down menus, 'hot spots', or other graphically defined regions, often detracting from the projected content, and effectively converting the projected image into a large computer screen. What is desired is a projection system which employs a light beam projector configured to interact with a projected image in a less intrusive manner that is also more flexible. More particularly it would be desirable to provide for data input and interaction utilizing the convenience of a handheld light beam projector which does not detract significantly from the projected image content.

SUMMARY

A method of controlling a display system is provided, the method including projecting an image onto a surface, projecting a control beam onto the projected image, tracing an interpretable pattern with the control beam, detecting the interpretable pattern, and correlating the interpretable pattern with a predefined command.

BRIEF DESCRIPTION OF THE DRAWINGS

FIG. 6 is a listing of representative predefined commands and possible corresponding predefined stroke patterns, according to an embodiment of the invention.

FIG. 7 is a flowchart demonstrating a method of controlling a display system, according to an embodiment of the invention.

DETAILED DESCRIPTION

Figure 1:
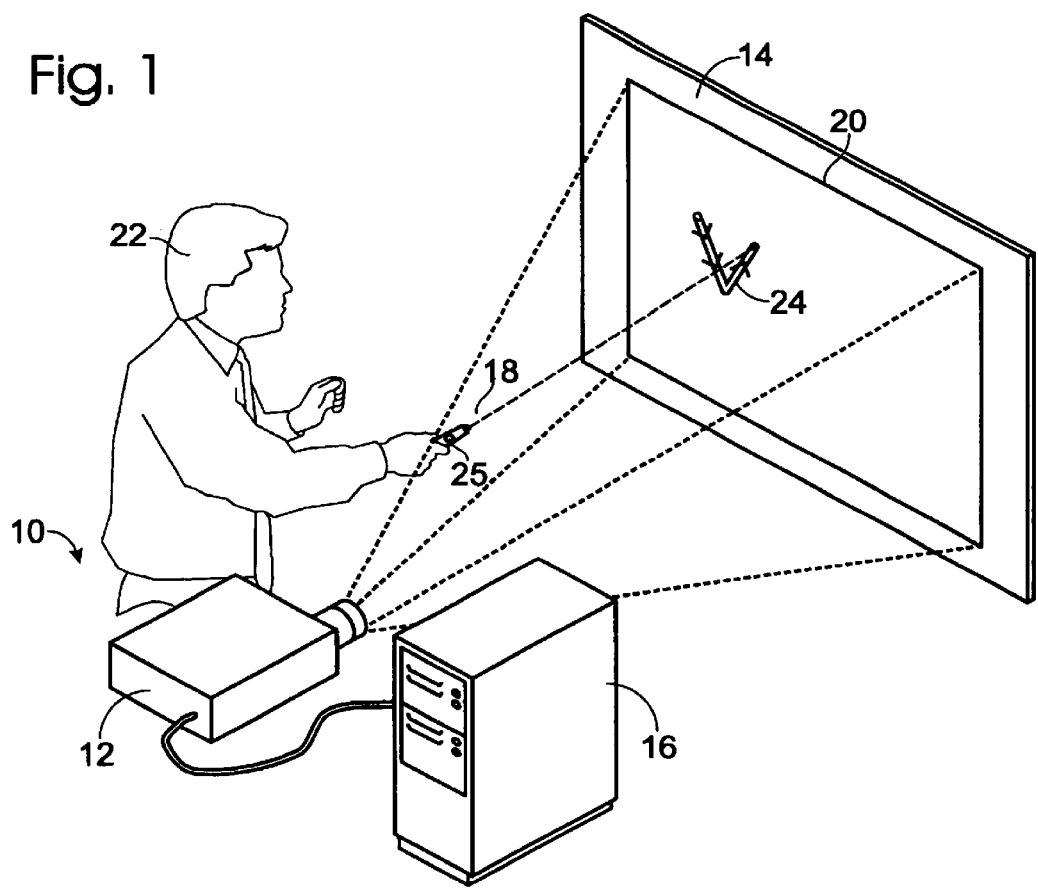
FIG. 1 is a view of a display system according to an embodiment of the present invention.

In FIG. 1, a display system is shown generally at 10. System 10 may include a digital image projector 12, a display surface 14, and an associated processor 16. The display system also may include a control projector 18 in the form of a light pen configured to project a light beam onto the display surface.

The digital image projector of FIG. 1 is depicted as a front projection device, however, any suitable mechanism for projecting a digital image may be suitable, including, but not limited to, overhead projectors and rear projection devices. For example, the projector may be an LCD projector or micromirror projector. For the purposes of the present disclosure, the images projected by the digital image projector may include still images or video images and, for consistency, will be referred to herein generally as images.

Figure 2:
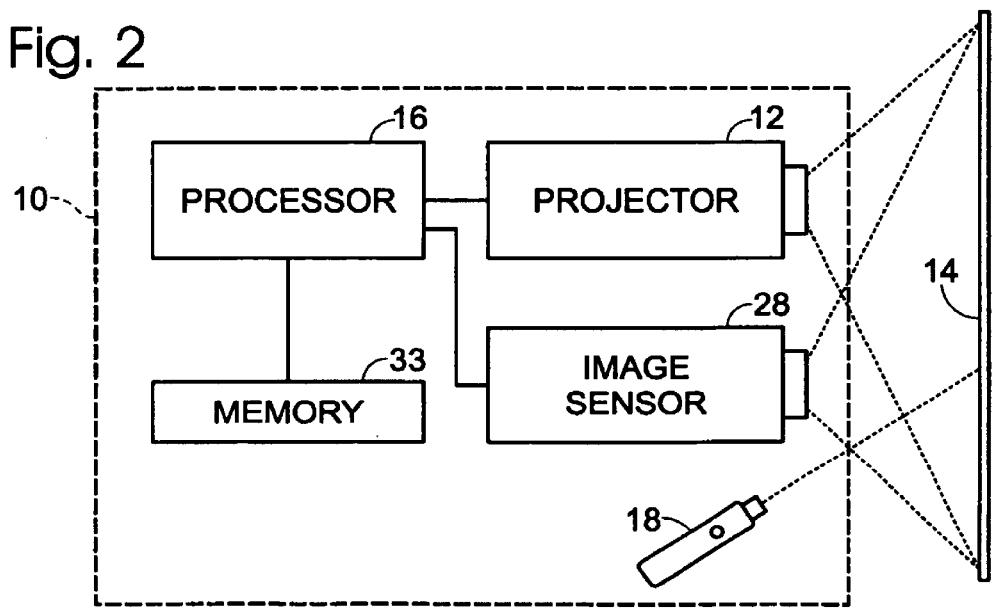
FIG. 2 is a schematic diagram of a display system according to another embodiment of the invention.
Figure 3:
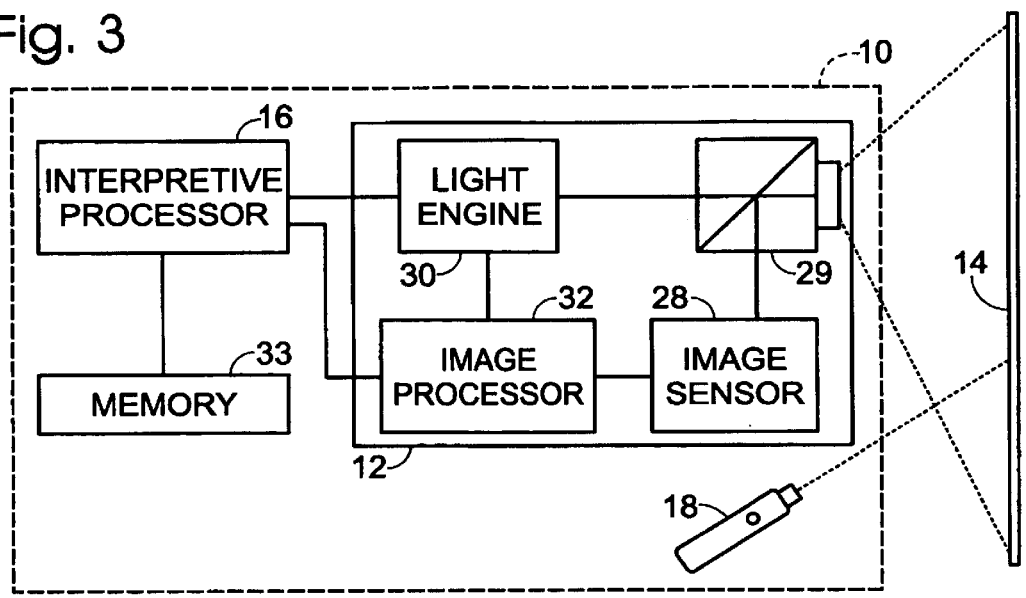
FIG. 3 is a schematic diagram of a display system according to yet another embodiment of the invention.

As shown for the display systems of FIGS. 1–3, and using common reference numbers for similar portions of the various display system embodiments, an image 20 may be projected by light pen 18 onto display surface 14 for viewing. Image 20 may then be viewed by an operator 22 as well as other viewers. Display surface 14 may be a screen, such as is typically employed in combination with a projection system, but any surface that is sufficiently reflective to provide a discernable image is suitable (including for example, a wall, etc.).

Light pen 18 may be any device capable of projecting a beam of light onto the display surface, and is also referred to generally as a control projector. Typically, light pen 18 is appropriately sized to be held in the hand of operator 22, so that the projected beam may be easily moved across the display surface. Light pen 18 may include one or more diode lasers, or the light pen may employ one or more alternative illumination sources configured to project a light beam onto the projected image. Light pen 18 may include for example a laser pointer, and may be used as a light pointer by operator 22. That is, the projected light beam may be used to draw the attention of viewers to selected portions of the projected image. However, light pen 18 may also be used to interact with a presentation that includes the projected image, typically by permitting the operator to modify the presentation. In particular, operator 22 may control the digital image projector, the content of the projected image, or some other aspect of the presentation by moving the light beam in a pattern that is detectable by an image sensor and interpretable by the processor.

It should be appreciated that where the light beam created by the light pen strikes the display surface, a spot of light is generated. The resulting spot may have any size, shape, color, intensity or flash sequence. Where the position of the control spot on the display image may be detected by the image sensor, and the movement of the light spot may be interpreted by the processor in order to modify the presentation, the light spot is referred to as a control spot. The light pen may be manipulated so that the control spot traces an interpretable pattern 24. The traced pattern may include one or more lines, curves, or other motions of the projected light spot forming a pattern that may be matched to a predefined stroke pattern. A predefined stroke pattern may include a series of one or more sequential strokes that have been associated with a command for either the digital image projector 12, associated processor 16, or any other component of display system 10. Typically, where traced pattern 24 matches a predefined stroke pattern, the command associated with that stroke pattern may be executed by display system 10.

The motion of the projected light spot may be monitored continuously so that, upon the execution of any traced pattern by the operator, the associated command may be executed spontaneously. However, during the course of a presentation, particularly where the light pen is being used generally as a pointer by the operator, one or more interpretable patterns may be traced inadvertently thereby resulting in the execution of unintended commands by the display system. It may therefore be desirable for the operator to employ a method of differentiating a light beam that is projected in order to trace an interpretable pattern (the control spot) from a light beam projected to otherwise assist in delivering the presentation (hereafter referred to as a pointer spot).

The display system may include an activating mechanism 25 that permits the operator to differentiate between projection of a control spot and projection of a pointer spot. The activating mechanism may include voice recognition by the display system, such that enunciation of a trigger phrase by the operator enables interpretation of traced patterns by the display system. Alternatively, the activating mechanism may be included in the light pen, for example a button, switch, etc. for use by the operator. The activating mechanism may include a wireless component, such as an appropriate radio or infrared signal that enables interpretation of traced patterns by the display system. Alternatively, triggering the activating mechanism may identify the control spot by modifying the projected light itself.

The projected control spot may be include light wavelengths that are not present in the pointer spot. Such wavelengths may be visible wavelengths, such as for example a green control spot replacing a red pointer spot while the activating mechanism is triggered. Alternatively, the wavelengths may be invisible wavelengths, such as the addition of infrared light to the control spot. Characteristic wavelengths of radiation may replace the wavelengths used to generate the pointer spot, or the characteristic wavelengths may be added to the wavelengths of the pointer spot.

Alternatively, or in addition, the pointer spot and control spot may exhibit equivalent wavelength characteristics but differ in intensity level. For example, triggering the activation mechanism may increase the intensity of the light projected by the light pen. The detection of a projected spot having an intensity above a selected threshold may then trigger pattern detection. While either increasing or decreasing the light intensity of the projected spot may serve as a trigger, increasing the projected light intensity may be preferable for differentiating the control light from the pointer light.

The change in projected light intensity may include reducing the intensity to zero, that is, the control light may be turned off or turned on in response to the activating mechanism. For example, triggering the activating mechanism may initiate a flash sequence in the projected light. The flash sequence may include a pattern recognizable by the display system. For example, the light spot may flash off and on a particular number of times, with a particular timing, at a particular flash rate, or any combination thereof. Such a flash pattern need not be discernible to a viewer or the operator in order to function as a signal to the display system.

Figure 4:
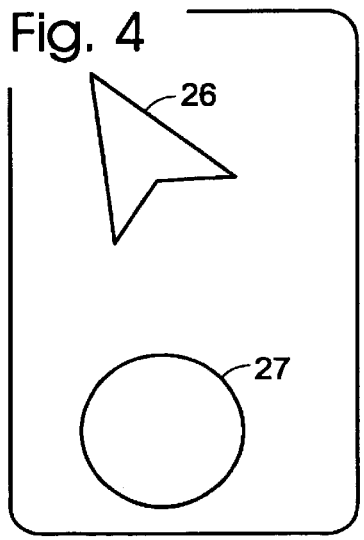
FIG. 4 illustrates how spot size and shape may be used to differentiate between a projected pointer spot and a projected control spot.

Alternatively, or in addition, the control spot may have a detectably different size or shape when compared to the pointer spot, such that a change in size and shape is detectable and interpretable by the display system and triggers pattern detection and interpretation. For example as shown in FIG. 4, a pointer spot 26 may have include an arrowhead outline, whereas activation of the control spot results in projection of a substantially circular and larger control spot 27. The display system may be configured so that upon detection of a projected light spot having increased size and circular shape, pattern detection and interpretation is initiated. It should be appreciated that a variety of alternative sizes and shapes of projected light spot may be used for either the control spot or the pointer spot, provided that they may be differentiated by the display system. It should also be appreciated that wavelength changes, intensity changes, flash patterns, and changes in spot size and shape may be used individually or in any combination as a response to the activating mechanism.

The control spot is detected by image sensor 28. Image sensor 28 may be a light-sensitive device capable of correlating the control spot with its position on the display surface over a selected time frame. The image sensor may be a camera, such as a charge-coupled device (CCD) camera. However, any other light sensor with the necessary light sensitivity may be useful as an image sensor for the purposes of the display system. The image sensor may be incorporated with, connected to, or otherwise associated with the digital image projector. Alternatively, the image sensor may be incorporated with, connected to, or otherwise associated with the associated processor.

Where the image sensor is distinct from the image projector, the image sensor may be located near the digital image projector, so that the field of view of the image sensor closely matches the area of the projected image, and so as to minimize distortion resulting from viewing the projected image at a significant angle. Alternatively, the image sensor may be attached to the digital image projector, such as by either mounting the image sensor on the exterior of the projector, or by incorporating the image sensor within the projector itself. In either case, the image sensor is preferably located so as to minimize differences in the field of view of the sensor and the area of the projected image.

The display system may share at least a portion of a single optical pathway for both image projection and image sensing. This may be accomplished, for example, by placing a beamsplitter 29 in the optical pathway of the digital image projector, so that the projected image generated by the light engine 30 of projector 12 passes through the beamsplitter, while a portion of the reflected light is directed to image sensor 28, as shown in FIG. 3. Using a single optical pathway for both projection and image sensing may simplify several aspects of using the display system, including but not limited to calibration of the display system.

Although the image sensor may detect both the projected image and the projected control spot, the control spot typically must be distinguished from the content of the projected image. As described above, the control spot may be distinguished by intensity level, or by wavelength properties. Alternatively, the control spot may be distinguished electronically, for example by subtraction of the image data used to generate the projected image from the image data captured by the image sensor using a comparator. Subtraction of the image data (the desired image) from the projected image readily typically results in identification of the additional light component that results during projection of the control spot onto the projected image. By detecting the control spot in sequential captured images, the changing position of the control spot may be recorded over time.

Control spot position information may be collected by the image sensor for interpretation by associated processor 16. The processor may be a discrete and independent processor, such as for example a personal computer that may control the digital image projector, as shown in FIG. 1. Alternatively, the processor may be incorporated in the digital image projector itself, as shown schematically in FIG. 2. The display system may incorporate a single processor that extracts position information about the control spot as well as performing interpretation of traced patterns. Alternatively, as shown in FIG. 3, the display system may include multiple processors, so that data from the image sensor may first be processed by an image processor 32 that may, for example, extract positional information about the control light before transmitting the position information to interpretive processor 16.

The pattern traced by the operator using the light pen may be more readily interpreted if the positional information recorded using the image sensor is converted into motion information. Motion detection may be accomplished by tracking the position of the control spot over a set time period. For example, by identifying the position of the control spot in a captured image, and comparing it to the position of the control spot in subsequent captured images. A movement vector for the control light spot may then be defined by the distance moved by the control spot between captured images. A series of movement vectors for the control spot may then be generated using the changing positions and the image capture rate. The movement vectors generally correspond to the relative motion of the control spot. The movement vector may then be used to interpret the pattern traced by the control spot.

It should be appreciated that a variety of strategies may be employed to interpret a pattern traced by the operator. Pattern interpretation may be initiated by triggering the activating mechanism on the light pen, as discussed above. Pattern interpretation may include video image capture of the projected image using the image sensor, for example to generate a series of sequential images showing the changing position of the control spot as the interpretable pattern is traced.

The pattern may be interpreted by determining the beginning and end points of the traced pattern. The angle between consecutive movement vectors may then be determined, and a reference rectangle may be drawn around the pattern. The reference rectangle may then be used to normalize the size of the traced pattern so as to simplify comparisons with a database of predefined stroke patterns. The database of predefined stroke patterns may be stored in a memory 33 connected to the processor. The normalized pattern may then be compared by the processor to each of the predefined patterns stored in the database to determine a corresponding display system command. Typically, the closeness of match to a predefined pattern is determined by calculation of an error function that represents how well the interpreted traced pattern matches a given predefined pattern. The predefined pattern that results in the smallest error function when compared to the interpreted pattern may then be selected as corresponding to the intended pattern. The command corresponding to that predefined pattern may then be executed by the processor and/or the digital image projector.

Figure 5:
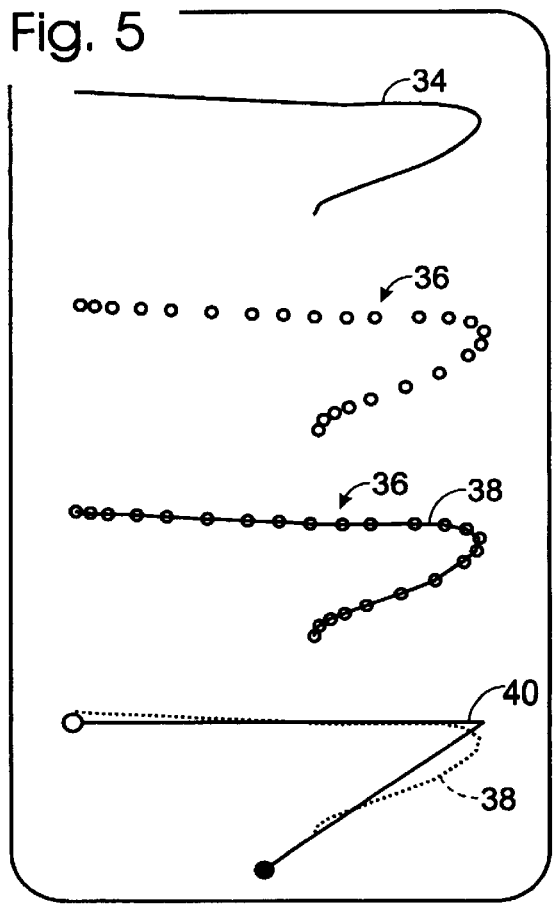
FIG. 5 illustrates capture of a traced pattern and interpretation of the traced pattern, according to an embodiment of the invention.

A simplified example of a suitable pattern interpretation method is depicted in FIG. 5. Trace 34 represents the pattern traced on the display surface by the operator using the projected control spot. Video image capture of the pattern being traced generates a sequential position series 36 of the control light spot during the pattern trace. The movement vectors 38 extracted from the sequential position series 36 may be used in a comparison to the predefined stroke patterns in the stroke pattern database, hopefully resulting in a close match, such as shown for movement vectors 38 and a closely matching predefined stroke pattern 40.

A variety of software systems already exist that are capable of interpreting traced patterns by comparing them to predefined stroke patterns. Such software systems have been developed, for example, in order for computer systems to recognize handwritten characters. However, time and processing resources may limit the ability of a computer system to perform true handwriting recognition. It has therefore generally been more effective for a software system to use predefined stroke patterns in order to represent selected commands or characters, even where the operator is required to learn those predefined stroke patterns. This strategy has been implemented successfully in a variety of handheld devices for text entry. These software systems utilize stroke pattern recognition where the stroke pattern is entered using a stylus and a touchpad. However, other pattern recognition strategies may be used with the display system of this disclosure.

Where the display system determines that a close match exists between the interpreted traced pattern and a predefined stroke pattern, the display system command corresponding to the predefined stroke pattern is typically executed. Such commands may typically include commands executed by the processor, but the executed commands may be related to any aspect of the display system. For example, such commands may control the brightness of the projected image, control the focus of the image, control the volume of an accompanying soundtrack, etc. The predefined commands may also relate to the content of a presentation that includes the projected image.

For example, the predefined commands may include any of the conventional commands more typically associated with pull-down menus or keyboard commands. Such predefined commands may correspond to, but are not limited to those provided in FIG. 6, along with exemplary corresponding stroke patterns. In the stroke patterns of FIG. 6, the open circle indicates the beginning of the stroke, and the closed circle indicates the end of the stroke.

In some instances, execution of a particular defined command may then necessarily be followed by the selection of a particular region of the projected image. For example, where the predefined command corresponds to 'underline the text selected', execution of the predefined command may result in the processor awaiting additional activation of the control spot, whereupon the operator may trace a line under, or trace a circle around, the text that the operator wishes to be underlined. The selected text would then be underlined in the projected image. Similarly, where the predefined command corresponds to 'insert circle figure', execution of the predefined command may result in the processor awaiting additional activation of the control spot, whereupon the operator may identify the location within the projected image where the circle should be inserted. A circle may then be added to the projected image at the specified location, for example, with activation of the light pen performing the same function as a 'click+drag' of a computer mouse.

In a more sophisticated example, an interpretable pattern may be traced that corresponds to an 'insert text' command. Upon the correct interpretation of the traced pattern, the processor may then await activation of the control spot, as discussed above. Triggering the activation mechanism may correspond to a 'single click' of a mouse, for example. Triggering the activation mechanism may be used to indicate where in the projected image the desired text is to be inserted, while simultaneously toggling the display system to a 'character recognition' mode. Subsequent traced patterns may then be limited to text pattern recognition of alphabet characters as discussed above. That is, the insert text command may enable recognition of an additional database of patterns corresponding to letters and numbers. Such a text input command may used for example to add annotations to an image during a presentation.

The commands described above permit the operator to interact with a projected presentation, however in order to interact with the content of a particular projected image it may be necessary to accurately correlate the projected control spot with a particular location within the projected image, and therefore with a selected aspect of the image data used to generate the projected image. In order to perform such correlation, the image sensor may be calibrated in order to establish a relationship between the captured image and the projected image. Such calibration processes may be simplified where the image sensor and the digital image projector utilize the same optical pathway, as discussed above. However, where the image sensor and the digital projector do not share an optical pathway, calibration of the image sensor may be useful in accurately mapping sensed input onto the image data used to display the projected image.

A variety of calibration methods and timing may be utilized. Calibration may be automatic upon startup of the projection device, or upon manual activation of a calibration routine, for example using an operator interface such as a touchpad on the digital image projector, or executing a command at the associated processor. The calibration procedure itself may be automatic, or may require operator input. For example, upon execution of a calibration command, the digital image projector may project a full screen of a selected color, whereupon the image sensor in combination with the processor interprets a captured image of the projected image to identify the four corners of the projected image and associate them with corresponding "corners" of the image data.

Alternatively, upon activation of a calibration feature, the operator may sequentially 'paint', or project a control spot onto, each corner of the projected image permitting the processor to map the captured image to the projected image data. Although the calibration methods described herein are intended to facilitate pattern recognition and correlation with image data, such calibration techniques may also be utilized to identify and digitally compensate for keystoning and other common projection errors that may affect the projected image.

It should be appreciated that the display system described herein lends itself to a method of control as set out in the flowchart 60 of FIG. 7. In particular, the method includes, but is not limited to, projecting an image onto a surface (62), projecting a control beam onto the projected image (64), tracing an interpretable pattern with the control beam (66), detecting the interpretable pattern (68), and correlating the interpretable pattern with a predefined command (70). As described above, the method may also further include executing the predefined command (72).

The control method and display system described herein permit a display system operator to interact with and/or control a presentation that includes a projected image without intruding upon the content of the projected image. Commands may be executed by the display system by moving a beam of light on the projected image, without interrupting the presentation, accessing a computer, or requiring the projection of menus or setting aside particular regions with the projected image. The resulting presentation may therefore be more seamless and uniform, and more intuitive for both the operator and the viewer.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims.

What is claimed is:

1. A method of controlling a display system, comprising:
   projecting an image onto a surface;
   projecting a control beam onto the surface;
   tracing an interpretable pattern with the control beam;
   detecting the interpretable pattern; and
   correlating the interpretable pattern with a predefined command.

2. The method of claim 1, further comprising executing the predefined command.

3. The method of claim 2, where executing the predefined command includes modifying a presentation.

4. The method of claim 3, where modifying the presentation includes at least one of highlighting a portion of the projected image and adding text to the projected image.

5. The method of claim 1, where the control beam is projected with a light pointer.

6. The method of claim 5, where projecting the control beam includes diffrentiations the control beam from the pointer beam by modifying one or more optical properties of a projected spot.

7. The method of claim 6, where modifying one or more optical properties includes modifying at least one of the intensity and the frequency of the projected control beam relative to the pointer beam.

8. The method of claim 1, where the interpretable pattern is detected using an image sensor.

9. The method of claim 1, where projecting the control beam includes directing the projected image along an optical pathway, and detecting the interpretable pattern includes directing a reflection of the projected image along the optical pathway.

10. The method of claim 1, where correlating the interpretable pattern with the predefined command includes interpreting the interpretable pattern.

11. The method of claim 10, where correlating the interpretable pattern with the predefined command includes comparing the interpreted pattern with a plurality of predefined stroke patterns.

12. The method of claim 11, where correlating the interpretable pattern with the predefined command further includes selecting a best matching predefined stroke pattern from the plurality of predefined stroke patterns.

13. The method of claim 12, further comprising executing the predefined command corresponding to the best matching predefined stroke pattern.

14. A display device, comprising:
   a projector configured to project an image onto a display surface;
   a control projector configured to project a pointer spot or a movable control spot on the display surface; an activating mechanisms configured to differentiate between projection of the pointer spot or the control spot;
   a sensor configured to detect a pattern traced by the movable spot on the display surface; and
   a processor, coupled to the sensor, configured to correlate the traced pattern with a predefined command.

15. The display device of claim 14, where the processor is configured to modify a presentation according to the predefined command.

16. The display device of claim 15, further comprising a memory connected to the processor, where the memory includes a database associating a plurality of predefined commands with corresponding traced patterns.

17. The display device of claim 14, where the projector is a digital projector.

18. The display device of claim 14, where the projector is an LCD projector or micromirror projector.

19. The display device of claim 14, where the control projector is a light pointer.

20. The display device of claim 14, where the sensor includes a CCD camera.

21. The display system of claim 14, wheren the activating mechanism differentiates between projection of the pointer spot and the control spot by modifying at least one the intensity and the frequency of the projected control beam relative to the pointer beam.

22. The display system of claim 14, wherein the activating mechanism differentiates between projection of the pointer spot and the control spot by modifying at least one of the size and the shape of the projected control beam relative to the pointer beam.

23. A display device, comprising:
  a projector configured to project an image onto a display surface;
  a control projector configured to project a pointer spot or a control spot on the display surface;
  an activating mechanism configured to differentiate between projection of the pointer spot or the control spot;
  an image sensor configured to detect movement of the control spot on display surface;
  a processor, coupled to the image sensor, configured to correlate the movement of the control spot with a predefined command.

24. The display device of claim 23, where the image sensor is incorporated within the projector.

25. The display device of claim 24, where the projector and the image sensor share an optical path.

26. The display device of claim 23, where the control projector is a light pen.

27. The display device of claim 23, where the control projector includes an activating mechanism for projecting the spot.

28. A display system, comprising:
  means for projecting an image onto a surface;
  means for projecting a control light beam on the surface;
  means for detecting a movement pattern of the light beam;
  means for interpreting the movement pattern of the light beam; and
  means for correlating the movement pattern with a predefined command.

29. The display system of claim 28, further comprising means for executing the predefined command.

\* \* \* \* \*

UNITED STATES PATENT AND TRADEMARK OFFICE
CERTIFICATE OF CORRECTION

PATENT NO. : 6,979,087 B2  
APPLICATION NO. : 10/286061  
DATED : December 27, 2005  
INVENTOR(S) : Honig et al.

It is certified that error appears in the above-identified patent and that said Letters Patent is hereby corrected as shown below:

In the Claims

Col. 7 (line 66), after line 66, insert the following line: --projecting a pointer beam onto the surface;--

Col. 7 (line) 67, delete "surface;" and insert therefor --surface, where the control beam is differentiable from the pointer beam;--

Col. 8 (line 15), delete "diffrentiations" and insert therefor --differentiating--.

Col. 8 (line 47), after "surface;", delete "an".

Col. 8 (line 48), before "activating", insert --an--.

Col. 8 (line 48), delete "mechanisms" and insert therefor --mechanism--.

Col. 8 (line 52), after "movable", insert --control--.

Col. 9 (line 3), delete "wheren" and insert therefor --wherein--.

Col. 9 (line 5), after "one", insert --of--.

Col. 9 (line 22) after "on", insert --the--.

Col. 10 (line 14), after line 14, insert the following line: --means for differentiating the control light beam from a pointer beam;--.

Signed and Sealed this

Twelfth Day of December, 2006

JON W. DUDAS  
*Director of the United States Patent and Trademark Office*